Aug. 14, 1945.  L. GESS  2,381,948
CONTROL SYSTEM
Filed Jan. 29, 1942  3 Sheets-Sheet 1
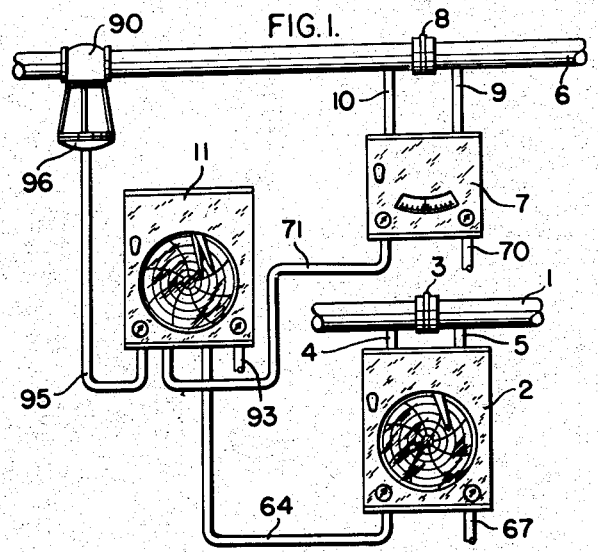
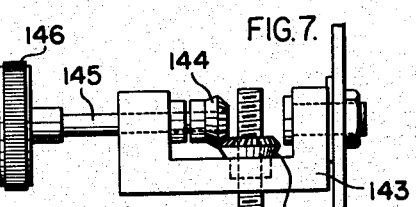
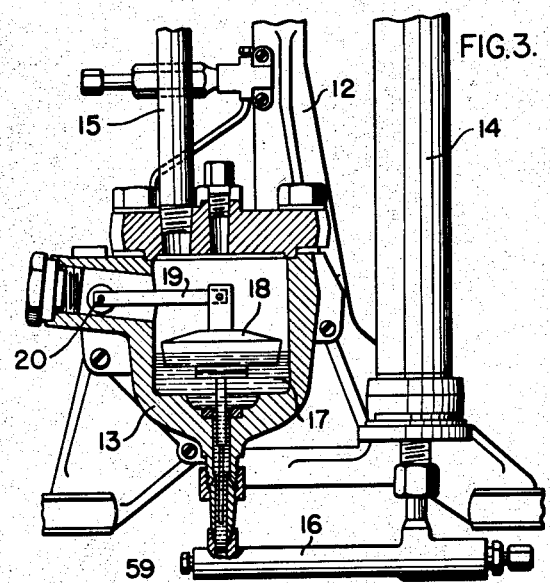
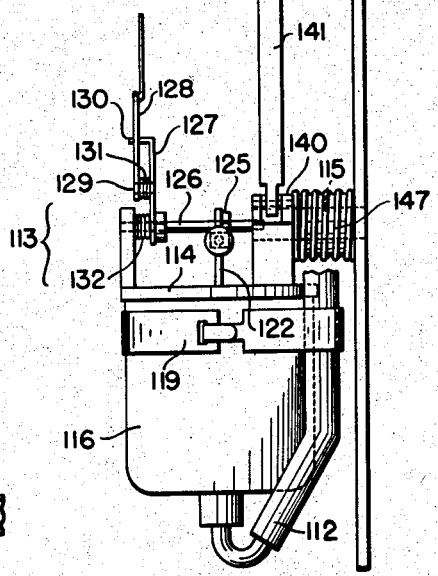
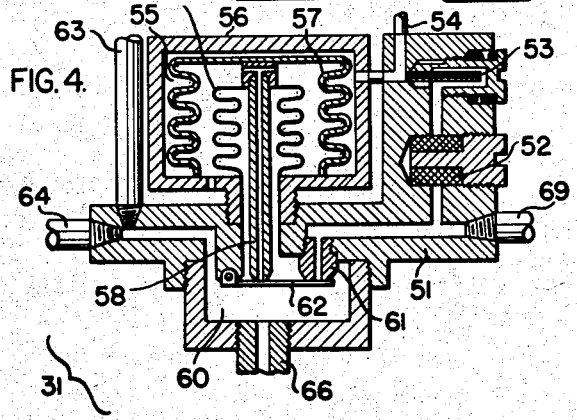
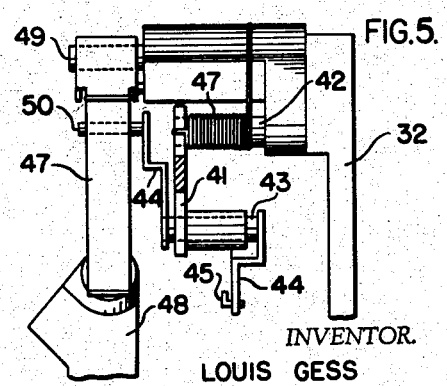
INVENTOR.
LOUIS GESS
BY C. B. Spangenberg
ATTORNEY Aug. 14, 1945.  L. GESS  2,381,948
CONTROL SYSTEM
Filed Jan. 29, 1942  3 Sheets-Sheet 2

INVENTOR.
LOUIS GESS
BY *G. B. Spangenberg*
ATTORNEY

Patented Aug. 14, 1945

2,381,948

UNITED STATES PATENT OFFICE 2,381,948

CONTROL SYSTEM

Louis Gess, Jenkintown, Pa., assignor to The Brown Instrument Company, Philadelphia, Pa., a corporation of Pennsylvania Application January 29, 1942, Serial No. 428,735

3 Claims. (Cl. 137—153)

The present invention relates to air control apparatus, and more particularly to pneumatic control instruments having provisions to adjust the control point of one control instrument in response to changes in the value of a control condition. The instrument is also provided with means whereby the control point may be changed manually as well as automatically.

One of the objects of the present invention is to provide a highly developed pneumatic control instrument which has provisions for manually or automatically adjusting the control point of the instrument or for changing the value at which the condition is being controlled.

Another object of the invention is to provide a control system in which one variable under control may automatically have its value changed in response to variations in the value of a second variable and in which the zero point of the first variable may be shifted at will. It is a further object of the invention to provide an instrument which may have its zero point changed without temporarily, artificially upsetting the control of a system of which the instrument is a part.

The instruments of my control system are adapted to be used in the control of the value of any condition such as temperature, pressure or moisture or any other condition which is to have its value controlled in response to variations in the value of another condition. By way of example, however, the invention will be described at it may be used to vary the value of the flow of a fluid in response to variations in the value of the flow of a second fluid.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings—

Fig. 1 is a diagrammatic view showing a flow control system.

Fig. 3 is a partial rear view of the instrument shown in Fig. 2.

Fig. 4 is a sectional view of a pilot valve used in the instrument of Fig. 2.

Fig. 5 is a view taken on lines 5—5 of Fig. 2.

Figure 2:
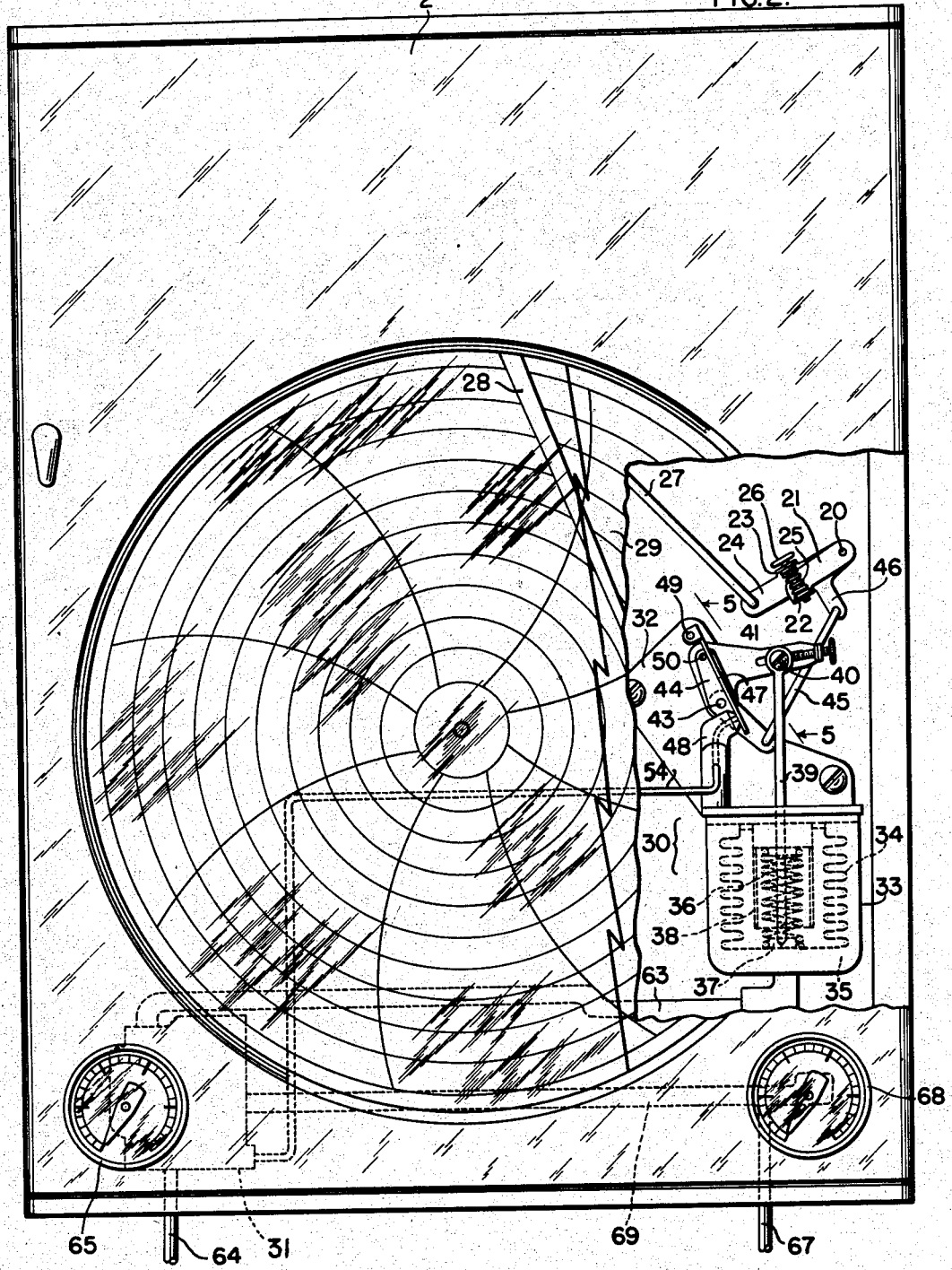
Fig. 2 is a front view of a pressure transmitting instrument which is adapted to set up a pressure proportional to the flow through a conduit.

Referring first to Fig. 1, there is shown a pipe 1 through which a fluid is flowing. The flow through the pipe is measured by a flow meter 2 of the differential pressure type which in turn sets up an air pressure that is proportional to the flow. To this end, the pipe 1 is provided with an orifice 3 from each side of which pressure taps 4 and 5 extend to the instrument 2.

In a similar manner, flow through a pipe 6, that is to be controlled in accordance with the flow in pipe 1 is measured by an instrument 7 that is similar to the instrument 2. The pipe 6 is accordingly provided with an orifice 8 from each side of which pressure taps 9 and 10 extend to the instrument 7. It is noted that the instrument 2 is disclosed as being a recording instrument while the instrument 7 is disclosed as being an indicating instrument. Each instrument has exactly the same measuring and pressure producing instrumentalities and either may be made indicating or recording as desired. In the system disclosed a record is made of the flow through pipe 1 by the instrument 2 and a record is made of the flow through the pipe 6 by an instrument 11, that also serves to control the flow through the pipe 6 in a manner to be described.

The instruments 2 and 7 are adapted to set up an air pressure proportional to the flow in pipes 1 and 6 respectively by means of measuring and transmitting instrumentalities disclosed in Figures 2 to 5. The instrument 2 will be described in detail.

Attached to the back of the instrument 2 by means of a bracket 12 is a U-tube manometer 13 having legs 14 and 15 that are connected respectively to the pressure taps 4 and 5. The legs are joined by a cross tube 16 to form, with the legs, a passage in which a suitable measuring liquid 17, such as mercury, may be placed. As the flow in pipe 1 changes the pressure on opposite sides of the orifice will change and will cause the level of the measuring liquid in a float chamber formed in leg 15 to rise or fall. As this occurs a float 18 on the surface of the liquid 17 acts through a lever 19 to rotate a shaft 20 to a position corresponding to the value of the flow.

Rotation of the shaft 20 acts on pneumatic mechanism and a pilot valve to set up an air pressure that varies with the flow in pipe 1. To this end, the shaft 20 extends through suitable bearings in the manometer and the casing of instrument 2, into the interior of the latter where it is attached at its inner end to a lever 21 (Fig. 2.) The lever 21 is provided with an upturned ear 22 which is held in adjustably spaced relation with a similar ear 23 on a lever 24 that is pivotally mounted on the shaft 20. A spring 25 between the ears holds them apart an amount that may be varied by a screw 26 which extends through the ear 23 and is threaded into the ear 22. In this manner the rotation of shaft 20 is imparted to lever 24. Through a link 27 that is attached to lever 24 and suitable connections (not shown) the rotation of shaft 20 moves a pen arm 28 across a chart 29 to make a record of the value of the flow through the pipe 1. The chart 29 is rotated by a suitable clock mechanism at any desired speed, such as one revolution per day.

Rotation of shaft 20 also operates a pressure transmitting unit 30 that, with a pilot valve 31 shown in detail in Fig. 4, serves to supply an air pressure varying with the flow to the recording and control instrument 11. The unit 30 consists of a support 32 that is suitably fastened in the instrument casing and which has attached to it a cup shaped casing 33 and a bellows 34 that form between them an expansible chamber 35. The bellows is kept in a normally expanded position by means of a spring 36 that rests with its lower end against an abutment 37 attached to the bellows end wall and with its upper end bearing against the lower surface of support 32 and surrounding an opening formed in the support. The amount that the bellows 34 can collapse is regulated by the engagement of its end wall with the lower end of a sleeve 38 that is also attached to the support 32.

As the bellows changes in length due to pressure changes in chamber 35 a rod 39 will be moved up and down. This rod has its lower end resting in a socket formed in abutment 37 and has its upper end adjustably pivoted at 40 to a bell crank lever 41 that is in turn pivoted at 42 (see Fig. 5) to the support 32. Attached to a shaft 43 journalled in the other arm of the bell-crank 41 is a two part lever 44 which has one end connected by a link 45 to an arm 46 formed on the lever 24. The bell crank 41 is normally biased by a light spring 47 in a clockwise direction in Figure 2 in order to keep the lower end of rod 39 against the abutment 37.

Pressure in the chamber 35 is controlled by the movement of a flapper valve 47 relative to a bleed nozzle 48 that is mounted on the support 32. The flapper valve 47 is pivoted to a projection 49 on the support and is normally biased by gravity and/or a spring toward the nozzle. The flapper may be moved away from the nozzle by means of a pin 50 that extends from the upper end of the lever 44.

The pilot valve 31 which has been referred to above is located in the lower left end corner of the instrument casing as shown by dotted lines in Fig. 2. This pilot valve is disclosed in detail in Fig. 4 and consists of a casing 51 that has suitable passages formed in it. One of these passages will direct air that is supplied to the pilot valve through a small filter 52 and a fixed restriction 53 to a pipe 54 that is connected with the bleed nozzle 48 of the transmitting unit 30. The air which flows through the restriction 53 also is in communication with a chamber 55. The outer wall of this chamber is formed by a container 56 that is attached to the casing 51. The inner wall of the chamber is formed by a flexible bellows 57, thereby making the chamber variable in size. Fastened to the interior of the bellows and projecting downwardly toward the casing 51 is an exhaust port 58 that moves upwardly or downwardly as the bellows 57 is collapsed or expanded by changes in pressure in the chamber. A second bellows 59 forms, with the first bellows, an interbellows space which is connected by suitable ports with the atmosphere.

The lower end of the movable exhaust port 58 extends into a chamber 60 that is connected with the above mentioned passageways by means of an intake port 61. The intake port 61 and the exhaust port 58 are adapted to be closed by a valve 62 which is pivoted in the casing and which is biased in a direction to close both ports by any suitable means. Chamber 60 communicates with the chamber 35 of the transmitting unit 30 by means of a pipe 63 and also communicates with the recording and controlling instrument 11 by means of a pipe 64. The pressure in the chamber 60 is indicated by means of a gauge 65 that is visible from the front of the instrument and is connected to the chamber by means of a connection 66.

Air is supplied to the transmitter unit 30 and the pilot valve 31 at a suitably regulated pressure through a pipe 67, the pressure in which is indicated by a pressure gauge 68. Connecting the pipe 67 and the pilot valve is a pipe 69 that supplies air to the passageways of the pilot valve.

In the operation of this instrument, as the shaft 20 is rotated due to changes in flow the flapper 47 is moved relative to the nozzle 48 to vary the escape of air through this nozzle and, therefore, the pressure in chamber 55. If, for example, the flow through pipe 1 increases the float 18 will be lowered in Fig. 3 causing the shaft 20 to rotate clockwise in that figure and counterclockwise in Fig. 2. Such a rotation of the shaft 20 will act through the levers 21 and 24 and arm 46 to move the link 45 upwardly to rotate lever 44 in a counterclockwise direction. As the lever 44 rotates in a counterclockwise direction the pin 50 attached to it will permit the valve 47 to move toward the nozzle 48 to stop the escape of air through the nozzle. This will produce an increase in pressure in the chamber 55 causing the bellows 57 to collapse and move the exhaust port 58 downwardly. As this port 58 moves downwardly its lower end will engage the valve 62 to stop the exhaust of air through this port and will move the valve clockwise to open the port 61 so that air can flow into the chamber 60 and increase the pressure in that chamber. This increase in pressure acts on the interior of bellows 59 to expand that bellows and bellows 57, moving port 58 upwardly. When the pressure in chamber 60 has been increased enough to balance the increase in pressure in chamber 55 the port 61 will be closed. Normally the area of bellows 59 is about five times that of bellows 57 so that the pilot valve produces a pressure in chamber 60 five times that in chamber 55. The pressure in chamber 60 is also transmitted through a pipe 63 to the chamber 35 in the unit 30 causing a collapse of the bellows 34 of that unit against the force of spring 36. As the bellows 34 collapses rod 39 will be moved upwardly to rotate bell crank 41 counterclockwise around its pivot 42. As the bell crank 41 moves it will move the pivot shaft 43 so that pin 50 on the upper end of lever 44 will tend to move flapper 47 away from the nozzle in a follow-up movement. Thus the flapper valve is shifted an amount sufficient to produce a pressure change in the system that is proportional to the original change in flow. It should be noted that the pivot point 40 on the upper end of rod 39 can be moved to the left or to the right in order to change the lever arm of the bell crank 41, and, therefore, the amount of follow-up that can be obtained. It is also noted that normally the valve 62 in the pilot valve unit simultaneously closes both the intake port 61 and the exhaust port 58 so that any pressure which has been set up will be maintained. Pressure is only changed in the system as a result of a change in flow which produces movement of the flapper valve 47 and consequently the exhaust port 58 in a direction to open the port 61 or in a direction to open the port 58. It will be obvious from the above description that a reduction in flow through the pipe 1 will result in a reduction in air pressure in the chamber 60 through exactly reverse movements of the various parts from those which have been described.

The indicating instrument 7 disclosed in Fig. 1 contains parts that are identical to those in Fig. 2 except that no record is made by this instrument of the flow through the pipe 6. Instrument 7 is supplied with air under pressure through a pipe 70 which may well be connected with the pipe 67 and operates in a manner similar to the instrument 2 to produce an increase in pressure in a pipe 71 as a result of an increase in flow in the pipe 6. Instrument 7 also operates to decrease the pressure in pipe 71 as a result of a decrease in the flow in pipe 6.

Figure 6:
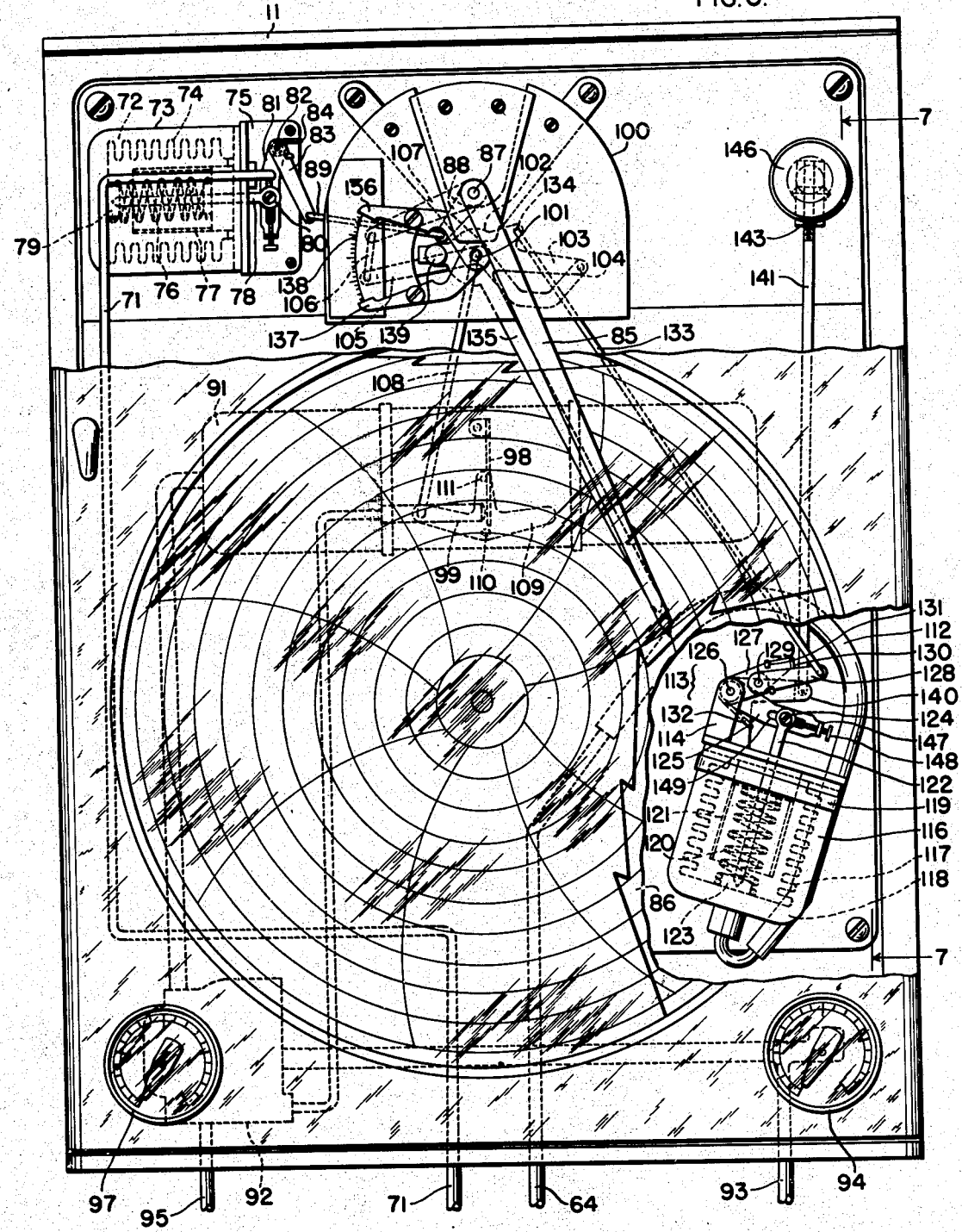
Fig. 6 is a view partly broken away showing the control instrument with its control point adjusting mechanism and, Fig. 7 is a view taken on lines 7—7 of Fig. 6.

The pressures in pipes 64 and 71 are applied respectively to the component parts of the instrument 11 which is disclosed in detail in Figs. 6 and 7. This instrument will now be described.

The pressure of the air set up by the instrument 7, which measures the flow in pipe 6, is applied through the pipe 71 to move a pen and to operate a control mechanism which is located in the instrument 11. The remote end of the pipe 71 is connected to an expansible chamber 72 in the upper left hand corner of instrument 11 which chamber is formed by a cup shaped casing 73 and a bellows member 74, both of which are attached at their open ends to a support 75 which is fastened in any suitable manner in the casing of the instrument 11. Increase in the pressure supplied through pipe 71 by the instrument 7 serves to collapse the bellows 74 against the pressure of a spring 76. The collapsing movement is limited by the engagement of the end wall of the bellows with a tubular stop member 77. Movement of the bellows is imparted to a rod 78 whose left end is in engagement with a socket that is formed in an abutment member 79 fastened to the end wall of the bellows. The right end of the rod is adjustably pivoted at 80 to a lever 81 which is in return fastened to a shaft 82 that is pivoted on the support 75. Also attached to the shaft 82 and movable with this shaft is a lever 83 which, along with the lever 81 and the rod 78, is normally forced in a clockwise direction by a spring 84 in order to keep the left end of the rod in engagement with the abutment 79.

Movement of the levers 81 and 83 serve to move a pen arm, having a pen on its lower end, across a chart 86 to make a record of the value of the flow through pipe 6. The pen is attached to a pivot shaft 87 to move with this shaft which also has attached to it and projecting downwardly therefrom a short arm 88. The arm 88 and the lever 83 are connected by a link 89 so that as the pressure in the chamber 72 varies to collapse or permit expansion of the bellows 74, the pen will be moved a correspondingly amount across the chart 86.

Movement of the shaft 87 also serves to operate a pneumatic control instrument which acts to set up air pressures varying in accordance with the variation in the flow in pipe 6 to be applied to a diaphragm valve 90 that is located in the pipe 6.

Located in the instrument 11 is an air control mechanism that serves to vary the pressure of a supply of air as the flow through the pipe 6 varies. This mechanism consists of an air controlled unit 91 and a pilot valve unit 92 that may take the form of the commercially available Brown Air-O-Line controller which is fully disclosed in Patent 2,125,081 issued to Coleman B. Moore on July 26, 1938. Air is supplied to this unit through a pipe 93 that may well be connected to the same source that supplies pipes 67 and 70 and the pressure of which may be measured by a gauge 94. The air then passes to the pilot valve 92. Air is supplied by the control mechanism at regulated pressures through a pipe 95 to a diaphragm chamber 96 in the valve 90. The pressure of the air to the valve is measured by pressure gauge 97.

The control unit is operated by movement of a flapper valve 98 relative to a bleed nozzle 99 in a manner fully described in the above mentioned patent. Movement is imparted to the flapper 98 in accordance with movement of the pen 85 by means of a lever system. This system is supported, in part, by a plate 100 that is suitably fastened in the instrument casing. Pivoted to the back of this plate at 101 is a multiple armed member 102 that has one arm 103 extending to the right of the pivot. The arm 103 supports at 104 one end of a floating lever 105, the other end of which is supported by the lower end of a link 106. The upper end of link 106 is pivoted to the outer end of an arm 107 that is fastened, along with pen arm 85 and arm 88, to the shaft 87 for movement therewith. The floating lever 105 is so shaped that its center point falls in a line axially of and behind the pivot 101. As the shaft 87 is rotated it will act through arm 107 and link 106 to raise or lower the left end of floating lever 105. This, in turn, imparts movement to the flapper 98 by means of a link 108 that is pivoted at its upper end to the midpoint of lever 105 and at its lower end to a lever 109. The lever 109 is pivoted at 110 and has a pin 111 that acts to move the flapper 98 away from the nozzle 99 against a natural bias toward the nozzle.

For each position of the pivot 104 a certain pressure in chamber 72 will cause a certain pressure to be produced by the control mechanism. Therefore, in order to change the pressure in pipe 95 for a given pressure in chamber 72 or to change the value at which the instrument will maintain the flow in pipe 6 some means must be provided to raise and lower the pivot point 104. Since it is desired to vary the flow through pipe 6 in accordance with the variations in flow in pipe 1 a means is provided which will adjust pivot point 104 in accordance with variations in pressure in pipe 64.

To this end, the pipe 64 is extended into the interior of instrument 11 and is connected by means of a flexible tube 112 with a remote control point setting unit 113. This unit consists of a support member 114 that is pivotally mounted on a shaft 115 in the casing (see Fig. 7). Attached to the support 114 are a cup shaped member 116 and a bellows 117 which together serve to form an expansible chamber 118 with which the other end of tube 112 communicates. A strap 119 is placed around the member 116 and the flexible tube 112 to prevent accidental movement of the latter relative to the unit 113.

As the pressure in the chamber 118 is increased the bellows 117 is contracted against the natural resiliency of the bellows and the force of a spring 120 to a limit that is determined by the end of a tubular stop 121. As the bellows expand and contract a bellows rod 122 that has its lower end in a socket 123, attached to the bellows end wall, will be moved axially. The upper end of the rod 122 is adjustably attached at 124 to a lever 125 which is in turn attached to a pivoted shaft 126. This shaft is coaxial with the shaft 115. Also attached to the shaft 126 is a lever arm 127 that in turn has a lever arm 128 pivoted to it at 129. The arm 127 is provided with an up-turned end 130 against which the arm 128 is normally held by a spring 131. Thus the three arms in effect form a bell-crank lever and turn as a unit around the axis of shaft 126 as the pressure in chamber 118 changes. The assembly of levers is normally biased in a clockwise direction by a spring 132 to keep the lower end of rod 122 in engagement with the socket 123.

Movement of the bellows 117 in response to pressure changes transmitted by instrument 2 is used to rotate the member 102 to raise and lower pivot 104 and thereby adjust the control point of instrument 11. This is accomplished by means of a link 133 which is pivoted at its lower end to the outer end of lever 128 and at its upper end to a projection or arm 134 on the member 102. In order to indicate the value at which the flow in pipe 6 is being maintained the member 102 is also provided with a downwardly extending index member 135. The lower end of the index cooperates with graduations on the chart 86 to indicate how the flow is being controlled.

In some cases it may be desirable to limit the flow in pipe 6 to some maximum or minimum value regardless of what the flow in pipe 1 may be. For this reason adjustable stops 136 and 137 are provided to limit the rotative movement of member 102. These stops are pivoted one in front of the other at 101 on the plate 100. Whereas the member 102 is on the back of the plate 100, the stops 136 and 137 are on the front of the plate and their left ends cooperate with a scale 138 to indicate their positions. Member 102 is provided with an abutment 139 which extends through a suitable opening in the plate 100 into a plane in which it will engage one or the other of the stops as member 102 reaches the limit of its travel.

If the pressure in chamber 118 should increase to such an extent that the member 102 would be rotated counterclockwise more than enough to bring abutment 139 into engagement with stop 137, spring 131 will give to permit separation of lever 128 from the turned up edge 130 of lever 127. The over-travel between parts 127 and 128 will be sufficient to permit any amount of contraction of bellows 117 that can take place. If, on the other hand, pressure in chamber 118 should be reduced to such an amount that abutment 139 on lever 102 will move into engagement with stop 136 the over-travel that will occur after this happens will merely move abutment 123, fas- tened to the end wall of the bellows, away from the lower end of rod 122. The socket in abutment 123 which engages the lower end of the rod 122 is deep enough so that any desired or necessary over-travel may be obtained without the socket moving completely away from the rod.

The connection between rod 122 and arm 125 is such that the upper end of the rod may be adjusted to different distances from the pivot point of the arm. To this end the arm 125 is provided with an upturned edge 147 into which an adjusting screw 148 is threaded. As the adjusting screw is rotated the pivot 124 of rod 122 is moved along a slot 149 in arm 125. This adjustment produces a change in the effective length of arm 125 and therefore a different amount of movement of the pivot point 104 for a given pressure change in the chamber 118. Stated in other words, the control point of the instrument 11 is changed different amounts for a given change in the flow in pipe 1. An indicator may be provided, if desired, to indicate the point of adjustment of the rod 122 along arm 125. It is to be noted that a similar type of connection is shown between rod 78 and lever 81 in the pen adjusting unit located in the upper left corner of the instrument.

The manual means which has been mentioned above for adjusting the control point of the instrument independently of any pressure change that may take in chamber 118 is operated by means of an arm 140 formed on the bracket 114 which supports the unit 113. Pivoted to the outer end of arm 140 is a rod 141 whose upper end is threaded and is received in threaded engagement with a beveled gear 142. The gear 142 rests in a bearing that is formed in a bracket 143 which is in turn suitably attached to the instrument casing, or to a sub-plate which may be located in this casing. As the gear 142 is rotated it will move rod 141 upwardly or will permit this rod to move downwardly under the force of a spring 147 which normally biases unit 113 in a clockwise direction in Figure 6. The gear 142 is rotated by means of another beveled gear 144 that is in mesh therewith. The beveled gear 144 is attached to a shaft 145 which is journalled for rotation in the front part of bracket 143, as best seen in Fig. 7. A knob 146 is attached to the front of shaft 145 whereby the shaft may be easily rotated when necessary.

The amount of adjustment that is provided is sufficient so that if a maximum pressure is in chamber 118 thereby moving the index 135 to its full scale position, the knob 146 can be rotated sufficiently to move unit 113 in a clockwise direction far enough to bring the index pointer to its zero position. Conversely, if there is a minimum pressure in the chamber 118 and the index 135 is, therefore, at its zero position on the chart, the knob 146 may be rotated enough to bring the index 135 to a 100% position on the chart. Such an adjustment permits a so called zero shift of the index with respect to any pressure that may be applied in the chamber 118 as a result of changes in flow in the pipe 1.

The operation of the instrument should be clear from the above detailed description, but a summary will now be given with the assumption that it is desired to control the flow through pipe 6 to some given value which may be adjusted in accordance with variations in the flow through pipe 1. In the normal operation as the flow through pipe 6 varies, the instrument 7 will set up varying pressures through pipe 71 to be applied to chamber 72 which in turn moves the pen 85 across the chart and operates the control units 91 and 92. As these units are operated varying pressures will be applied through pipe 95 to the diaphragm chamber 96 of valve 90. If the flow increases through pipe 6 an increase in pressure will be applied in pipe 95 to close the valve and reduce the flow to its normal value. Conversely if the flow through pipe 6 decreases the pressure in pipe 95 will be decreased to permit the valve to open and increase the flow to its normal value. In view of the fact that some desired ratio is to be maintained between the flow in pipes 1 and 6 a means is provided to shift the control point of the instrument 11 as the flow in pipe 1 varies. Therefore, the instrument 2 sets up a pressure in pipe 64 which is proportional to the flow in pipe 1. This pressure is applied to the unit 113 to shift the right hand end of floating lever 105 and thereby operate the control unit 91 and 92 to vary the pressure in pipe 95 and the flow through pipe 6 as the flow through pipe 1 changes.

If it is desired to increase or decrease the amount of flow through one pipe for a given flow through the other the knob 146 may be rotated to bodily shift the unit 113 around its supporting shaft 115. If there had been a minimum pressure in chamber 118 indicating that no fluid was flowing through pipe 1, normally the index 135 would be over the zero point on the chart 86 to stop the flow through pipe 6. With an adjustment of the type provided by the bodily movement of unit 113 the control instrument may be made to supply a certain amount of fluid through pipe 6 when there is no flow in pipe 1 by rotating unit 113 in one direction or may be made to prevent any flow through pipe 6 until there is some predetermined flow in pipe 1 by rotating unit 113 in the opposite direction. Thus the effective zero point of the instrument is shifted by rotation of knob 146. This adjustment may be made while the control system is in operation without upsetting the system.

If it is desired to vary the ratio of the flow through pipe 1 with respect to that through pipe 6 the upper end of rod 122 may be moved toward or away from the fulcrum point 126 of the arm 125. Such an adjustment will provide more or less movement of the index 135 for a given pressure change in chamber 118. If the rod 122 is in one position the leverage between this rod and link 133 may be such that for two units of flow through pipe 1 there will be two units through pipe 6. By changing the position of rod 122 on arm 125 two units of flow through pipe 1 may be obtained for three units or one unit of flow through pipe 6.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. In a measuring and control instrument having a casing and a chart upon which a record of the value of a condition may be made, a control unit operative to set up a control impulse to control the value of a variable condition, control point adjusting mechanism for said unit located behind the chart, said mechanism being mounted on a support, means to pivotally mount said support in the casing, said mechanism including an expansible chamber having a movable wall adapted to be moved by changes in pressure applied thereto and attached to said support, connecting levers extending between said control unit and said movable wall constructed and arranged so that the latter can adjust the former, means to adjust the connection between said levers to vary the amount of movement of said levers for a given movement of said wall, said support including an arm extending away from its pivot, a rod pivotally attached to said arm and extending in the casing to a point beyond the edge of the chart, and manually operable means acting on the extending end of said rod to shift the same whereby said support will be adjusted around its pivot to change the position of said levers.

2. In a control instrument having a control unit with an adjustable control point and being mounted in a casing, a control point adjusting mechanism for said unit mounted in said casing comprising a support pivotally mounted in said casing, parts forming an expansible chamber mounted on said support, one of said parts comprising an expansible wall that is expanded in response to a pressure applied thereto, a lever system moved by said expansible wall to adjust the control point of said unit, an arm attached to said support coaxial with its pivot and extending away from the same, and means to move the outer end of said arm to thereby rotate said support around its pivot to adjust said lever system.

3. In a control instrument having a control unit with an adjustable control point and being mounted in a casing, control point adjusting means for said unit mounted in said casing including a support pivotally mounted in said casing, parts forming an expansible chamber mounted on said support, one of said parts including a movable wall that is expanded in response to a pressure thereto, an adjustable lever system to adjust the control point of said unit, a connection between said wall and lever system to permit movement of the latter as said wall moves, means to vary the point of engagement between said lever system and said connection, and means to bodily move said support around its pivot to adjust said lever system.

LOUIS GESS.